United States Patent
Lee et al.

(10) Patent No.: US 10,408,107 B2
(45) Date of Patent: Sep. 10, 2019

(54) POWER APPARATUS INCLUDING REDUCING AGENT SUPPLY CONTROL SYSTEM AND REDUCING AGENT SUPPLY CONTROL METHOD

(71) Applicant: DOOSAN INFRACORE CO., LTD., Incheon (KR)

(72) Inventors: Jae Hyoung Lee, Incheon (KR); Tae Sub Kim, Seoul (KR); Ki Bum Kim, Seoul (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 32 days.

(21) Appl. No.: 15/568,606

(22) PCT Filed: Apr. 21, 2016

(86) PCT No.: PCT/KR2016/004142
§ 371 (c)(1),
(2) Date: Oct. 23, 2017

(87) PCT Pub. No.: WO2016/171481
PCT Pub. Date: Oct. 27, 2016

(65) Prior Publication Data
US 2018/0149057 A1     May 31, 2018

(30) Foreign Application Priority Data
Apr. 21, 2015    (KR) .................... 10-2015-0056125

(51) Int. Cl.
*F01N 9/00*     (2006.01)
*F01N 3/20*     (2006.01)
(Continued)

(52) U.S. Cl.
CPC ......... *F01N 3/208* (2013.01); *B01D 53/9495* (2013.01); *F01N 3/2066* (2013.01);
(Continued)

(58) Field of Classification Search
CPC .. F01N 3/208; F01N 3/2066; F01N 2560/026; F01N 2560/07
See application file for complete search history.

(56) References Cited

U.S. PATENT DOCUMENTS

| 5,628,186 A | 5/1997 | Schmelz |
| 2004/0118108 A1 | 6/2004 | Ripper et al. |

(Continued)

FOREIGN PATENT DOCUMENTS

| DE | 4315278 A1 | 11/1994 |
| DE | 19903439 A1 | 8/2000 |

(Continued)

OTHER PUBLICATIONS

International Search Report for PCT/KR2016/004142 dated Aug. 19, 2016.
(Continued)

*Primary Examiner* — Jonathan R Matthias
(74) *Attorney, Agent, or Firm* — Hauptman Ham, LLP (57) ABSTRACT

A power apparatus including a reducing agent supply control system includes: an engine configured to emit exhaust gas containing nitrogen oxide by burning air and fuel at a preset air-fuel ratio; an exhaust passage configured such that the exhaust gas emitted by the engine moves therethrough; a pressure sensor configured to actually measure the pressure of air which is supplied to the engine; a nitrogen oxide concentration sensor installed on the exhaust passage, and configured to measure the nitrogen oxide (NOx) concentration of the exhaust gas; a reducing agent supply unit configured to supply a reducing agent to the exhaust gas which moves along the exhaust passage; and a control unit configured to determine the amount of reducing agent to be supplied based on information received from the pressure (Continued)

sensor and the nitrogen oxide concentration sensor, and to control the reducing agent supply unit.

11 Claims, 3 Drawing Sheets (51) Int. Cl.
F02B 37/00 (2006.01)
B01D 53/94 (2006.01)
F01N 11/00 (2006.01)
(52) U.S. Cl.
CPC ............... F01N 9/00 (2013.01); F01N 11/00 (2013.01); F02B 37/00 (2013.01); F01N 2560/026 (2013.01); F01N 2560/06 (2013.01); F01N 2560/07 (2013.01); F01N 2560/08 (2013.01); F01N 2610/02 (2013.01); F01N 2900/0416 (2013.01); F01N 2900/08 (2013.01); F01N 2900/1402 (2013.01); F01N 2900/1404 (2013.01); F01N 2900/1406 (2013.01); F01N 2900/1821 (2013.01); Y02T 10/24 (2013.01); Y02T 10/47 (2013.01)

(56) References Cited

U.S. PATENT DOCUMENTS

| 2015/0224447 | A1 | 8/2015 | Nishizawa et al. |
| 2015/0308321 | A1* | 10/2015 | Zhang ................... F01N 9/005 60/286 |

FOREIGN PATENT DOCUMENTS

| EP | 2787186 A1 | 10/2014 |
| JP | 2014-055566 A | 3/2014 |
| JP | 2014055566 A | 3/2014 |
| KR | 10-2006-0069789 A | 6/2006 |
| KR | 10-2014-0009457 A | 1/2014 |
| KR | 10-1497833 B1 | 3/2015 |
| KR | 10-1513804 B1 | 4/2015 |

OTHER PUBLICATIONS

European Search Report dated Aug. 30, 2018, in connection with the European Patent Application No. 16783414.2.

* cited by examiner

POWER APPARATUS INCLUDING REDUCING AGENT SUPPLY CONTROL SYSTEM AND REDUCING AGENT SUPPLY CONTROL METHOD

CROSS REFERENCE TO RELATED APPLICATION

This present application is a national stage filing under 35 U.S.C § 371 of PCT application number PCT/KR2016/004142 filed on Apr. 21, 2016 which is based upon and claims the benefit of priority to Korean Patent Application No. 10-2015-0056125 filed on Apr. 21, 2015 in the Korean Intellectual Property Office. The disclosures of the above-listed applications are hereby incorporated by reference herein in their entirety.

TECHNICAL FIELD

Embodiments of the present invention relate to a power apparatus including a reducing agent supply control system and a reducing agent supply control method, and more specifically to a power apparatus including a reducing agent supply control system and a reducing agent supply control method, which control the amount of supply of reducing agent adapted to reduce nitrogen oxide contained in exhaust gas.

BACKGROUND ART

Generally, a selective catalytic reduction (SCR) system is a system which reduces nitrogen oxide by purifying exhaust gas which is generated in a diesel engine, a boiler, an incinerator, or the like.

A selective catalytic reduction system reduces nitrogen oxide into nitrogen and water vapor by reacting nitrogen oxide contained in exhaust gas with a reducing agent while passing the exhaust gas and the reducing agent through a reactor in which a catalyst is installed.

A selective catalytic reduction system uses urea directly injected or ammonia $NH_3$ generated by hydrolyzing urea and then injected, as a reducing agent adapted to reduce nitrogen oxide.

Generally, a sensor is installed in front of a reactor for selective catalytic reduction in which a catalyst is installed, a nitrogen oxide concentration is actually measured, and an appropriate amount of reducing agent required to reduce nitrogen oxide contained in the exhaust gas is injected.

However, reaction efficiency varies depending on various factors, such as the degree of activation of a catalyst, whether a catalyst has been poisoned or not, the temperature of exhaust gas, etc. When the concentration of nitrogen oxide is actually measured before a selective catalytic reduction reaction, the amount of reducing agent is quantitatively determined, and then a corresponding amount of reducing agent is injected, various factors and errors occurring in an actual reaction are not taken into account, and thus a problem arises in that it is difficult to precisely control a reduction in nitrogen oxide contained in exhaust gas.

Furthermore, in the future, such a selective catalytic reduction system is required to have performance and operation in which the amount of nitrogen oxide (NOx) emitted from a diesel engine for a ship meets the International Maritime Organization (IMO) Tier-III requirements.

Meanwhile, when ammonia which is used as a reducing agent is excessively injected in order to sufficiently meet the International Maritime Organization (IMO) Tier-III requirements, ammonia slip occurs. Ammonia slip is a phenomenon in which unreacted ammonia which did not participate in a reaction is emitted to the outside along with exhaust gas when an amount of ammonia larger than the amount of ammonia which can quantitatively react with nitrogen oxide is injected.

When ammonia slip occurs, unreacted ammonia may reduce the life span of a catalyst or may cause the corrosion of the catalyst. When unreacted ammonia is emitted to the outside along with exhaust gas, an air pollution problem attributable to ammonia may occur additionally.

In contrast, when the amount of ammonia which is used as a reducing agent is insufficient, nitrogen oxide contained in exhaust gas cannot be sufficiently reduced, and thus the IMO Tier-III requirements are not met.

Accordingly, there is required the operation of a selective catalytic reduction system which can meet the IMO Tier-III requirements not only in the initial stage of the operation of a diesel engine but also in the case of a variation in load and which can also minimize the occurrence of ammonia slip.

Accordingly, in order to control the amount of reducing agent to be supplied so that an appropriate amount of reducing agent can be used, conventionally, the amount of nitrogen oxide to be removed is calculated using the total amount of exhaust gas, calculated by using the amount of intake air measured using an MAF (mass air flow) sensor and the amount of fuel of an engine calculated using an electronic control unit (ECU), and a nitrogen oxide concentration measured in exhaust gas, and then the amount of reducing agent to be supplied is controlled based on the calculated amount of nitrogen oxide to be removed.

However, in the case of an engine used for a ship, a problem occurs in that it is difficult to ensure the durability of an MAF (mass air flow) sensor due to salt, moisture, or the like.

As a result, for environmental or economic reasons, there is a need for a method capable of controlling the amount of reducing agent to be supplied without requiring an MAF (mass air flow) sensor.

DISCLOSURE

Technical Problem

Embodiments of the present invention provide a power apparatus including a reducing agent supply control system and a reducing agent supply method, which can effectively control the supply of a reducing agent which is used in a reduction reaction of nitrogen oxide.

Technical Solution

According to an embodiment of the present invention, there is provided a power apparatus including a reducing agent supply control system, the power apparatus including: an engine configured to emit exhaust gas containing nitrogen oxide by burning air and fuel at a preset air-fuel ratio; an exhaust passage configured such that the exhaust gas emitted by the engine moves therethrough; a pressure sensor configured to actually measure the pressure of air which is supplied to the engine; a nitrogen oxide concentration sensor installed on the exhaust passage, and configured to measure the nitrogen oxide (NOx) concentration of the exhaust gas; a reducing agent supply unit configured to supply a reducing agent to the exhaust gas which moves along the exhaust passage; and a control unit configured to determine the amount of reducing agent to be supplied based on information received from the pressure sensor and the nitrogen oxide concentration sensor, and to control the reducing agent supply unit.

The control unit: may calculate the mass of air for each stroke of one or more cylinders of the engine from the pressure of air, actually measured by the pressure sensor, by using preset correlation data between the pressure and mass of air to be supplied to the engine; may calculate the mass of air per hour by using the rotation speed of the engine, the total number of cylinders of the engine, and the calculated mass of air for each stroke; may calculate the mass of fuel per hour by dividing the mass of air per hour by an air-fuel ratio; and may calculate the total amount of nitrogen oxide emitted from the engine by using the nitrogen oxide (NOx) concentration measured by the nitrogen oxide concentration sensor, the mass of air per hour, and the mass of fuel per hour, and may determine the amount of reducing agent to be supplied, which reduces the total amount of nitrogen oxide.

The correlation data may be set by acquiring correlations between the masses of air for each stroke of the cylinders of the engine and the pressures of air to be supplied to the engine through experiments.

The control unit may calculate the mass of air per hour by using the following equation:

$$\text{mass of air per hour } \left[\frac{\text{kg}}{\text{hour}}\right] = \\ \text{mass of air for each stroke } \left[\frac{\text{mg}}{\text{hour}}\right] * \left(\frac{1 \text{ kg}}{10^6 \text{ mg}}\right) * \\ \left(\frac{2 \text{ strokes}}{\text{number of cycles of engine}}\right) * \text{rpm} * \left(\frac{60 \text{ min}}{1 \text{ hour}}\right) * \text{number of cylinders}$$

The power apparatus including a reducing agent supply control system may further include: a turbocharger including a turbine configured to be rotated by a pressure which the exhaust gas has and a compressor configured to receive power from the turbine and to compress the air to be supplied to the engine, and installed on the exhaust passage; and an intercooler installed on a path between the compressor of the turbocharger and the engine. Furthermore, the pressure sensor may be installed downstream of the intercooler, and may measure the pressure of air which is compressed by the turbocharger and is then supplied to the engine.

The control unit may correct the calculated amount of reducing agent to be injected by considering the rotation speed and load of the engine and the reduction rate of the reducing agent.

Furthermore, the power apparatus including a reducing agent supply control system may further include: a selective catalytic reduction reactor installed on the exhaust passage, and including a catalyst configured to accelerate a reaction between nitrogen oxide contained in the exhaust gas and the reducing agent supplied by the reducing agent supply unit; and a temperature sensor configured to measure the internal temperature of the selective catalytic reduction reactor. Furthermore, the control unit may correct the calculated amount of reducing agent to be supplied according to the temperature of the catalyst.

Furthermore, according to an embodiment of the present invention, there is provided a reducing agent supply control method for reducing nitrogen oxide (NOx) contained in exhaust gas emitted by an engine after the engine has received air and has burned the air, together with fuel, at a preset air-fuel ratio, the reducing agent supply control method including: actually measuring the pressure of air to be supplied to the engine, and calculating the mass of air for each stroke of one or more cylinders of the engine by using preset correlation data; calculating the mass of air per hour by using the mass of air for each stroke which is estimated by considering the rotation speed of the engine and the number of cylinders of the engine; calculating the mass of fuel per hour by dividing the mass of air per hour by an air-fuel ratio; measuring the nitrogen oxide (NOx) concentration of the exhaust gas emitted from the engine; calculating the total amount of nitrogen oxide emitted from the engine by using the mass of air per hour, the mass of fuel per hour, and the nitrogen oxide concentration; and calculating the amount of reducing agent to be supplied, which reduces the total amount of nitrogen oxide.

The correlation data may be related to correlations between the masses of air for each stroke of the cylinders of the engine and the pressures of air to be supplied to the engine, which are acquired through experiments.

The mass of air per hour may be calculated using the following equation:

$$\text{mass of air per hour } \left[\frac{\text{kg}}{\text{hour}}\right] = \\ \text{mass of air for each stroke } \left[\frac{\text{mg}}{\text{hour}}\right] * \left(\frac{1 \text{ kg}}{10^6 \text{ mg}}\right) * \\ \left(\frac{2 \text{ strokes}}{\text{number of cycles of engine}}\right) * \text{rpm} * \left(\frac{60 \text{ min}}{1 \text{ hour}}\right) * \text{number of cylinders}$$

Furthermore, the reducing agent supply control method may further include correcting the calculated amount of reducing agent to be supplied by considering the rotation speed and load of the engine and the reduction rate of the reducing agent.

Furthermore, the reducing agent supply control method may further include: accelerating a reduction reaction adapted to convert nitrogen oxide by using a catalyst; and correcting the calculated amount of reducing agent to be supplied according to the temperature of the catalyst.

Advantageous Effects

According to the embodiments of the present invention, the power apparatus including a reducing agent supply control system and the reducing agent supply method can effectively control the supply of a reducing agent which is used in a reduction reaction of nitrogen oxide.

MODE FOR INVENTION

Embodiments of the present invention will be described in detail below with reference to the accompanying drawings so that those having ordinary knowledge in the art to which the present invention pertains can easily practice the present invention. The present invention may be implemented in various different forms, and is not limited to the embodiments described herein.

It is noted that the drawings are schematic, and are not necessarily drawn to scale. The relative dimensions and ratios of the components in the drawings may be exaggerated or diminished in size for the sake of clarity and convenience, and such arbitrary dimensions are merely illustrative and are not limitative. Furthermore, the same reference symbol is used for the same structure, element or part shown in two or more drawings in order to represent similar features.

The embodiments of the present invention specifically illustrate ideal embodiments of the present invention. As a result, various modifications of illustrations are expected. Accordingly, the embodiments are not limited to the specific forms of illustrated regions, and include, for example, the modifications of shapes resulting from manufacture.

A power apparatus 101 including a reducing agent supply control system according to an embodiment of the present invention will be described below with reference to FIG. 1.

Figure 1:
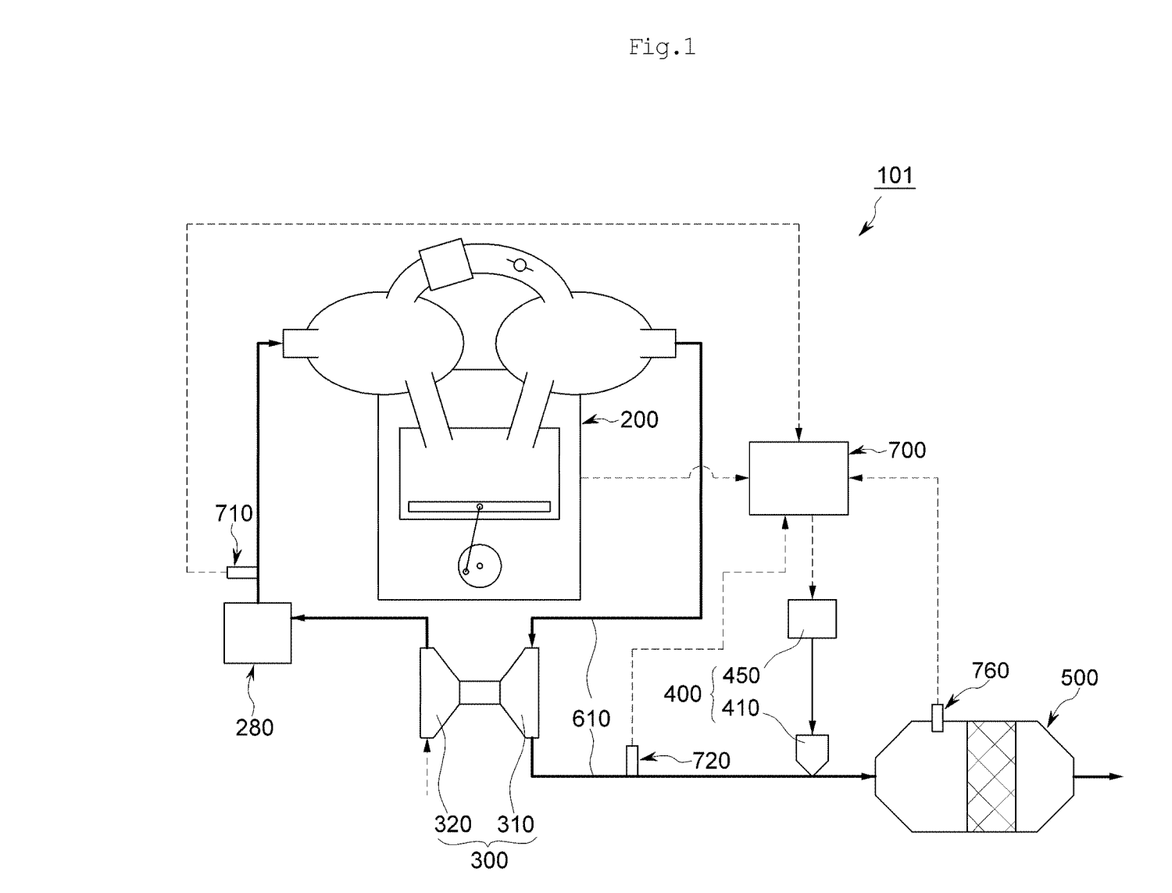
FIG. 1 is a view showing the configuration of a power apparatus including a reducing agent supply control system according to an embodiment of the present invention.

As shown in FIG. 1, the power apparatus 101 including a reducing agent supply control system according to the embodiment of the present invention includes an engine 200, an exhaust passage 610, a turbocharger 300, a pressure sensor 710, a nitrogen oxide concentration sensor 720, a reducing agent supply unit 400, and a control unit 700.

Furthermore, the power apparatus 101 including a reducing agent supply control system according to the embodiment of the present invention may further include an intercooler 280, a selective catalytic reduction reactor 500, and a temperature sensor 760.

The engine 200 includes one or more cylinders in which explosion strokes occur. The engine 200 generates power by burning air and fuel at a preset air-fuel ratio. In this case, the air-fuel ratio may be preset by a manufacturer for each rotation speed and each load according to the type of engine 200.

Furthermore, in an embodiment of the present invention, the engine 200 emits exhaust gas containing a material under environmental regulations, such as nitrogen oxide NOx, or the like.

As an example, the engine 200 may be a diesel engine, and may be used as a main power source for a ship. Furthermore, the engine 200 may be a four-stroke engine or two-stroke engine.

The exhaust passage 610 emits the exhaust gas of the engine 200. In other words, the exhaust gas emitted by the engine 200 moves along the exhaust passage 610.

The turbocharger 300 is connected to the cylinders of the engine 200, and pushes combustion air into the cylinders of the engine 200.

More specifically, the turbocharger 300 is installed on the exhaust passage 610, and includes a turbine 310 configured to be rotated by pressure which the exhaust gas has and a compressor 320 configured to push air into the engine 200 by means of the rotating power of the turbine 310.

As described above, the turbocharger 300 compresses new external air and supplies the compressed air to the engine body 200 by rotating the turbine 310 by means of pressure which the exhaust gas emitted by the engine body 200 has, thereby improving the output of the engine body 200.

The intercooler 280 cools the intake air of the engine 200.

More specifically, the intercooler 280 is disposed between the turbocharger 300 and the engine 200, and cools the air compressed by the turbocharger 300. The density of air compressed by the turbocharger 300 with effort becomes low due to heat which is generated when the turbocharger 300 compresses air. For this reason, charging efficiency is degraded in summer or the like when temperature is high. The intercooler 280 increases the density of air, compressed by the turbocharger 300, by cooling the air.

The pressure sensor 710 actually measures the pressure of air which is supplied to the engine 200 by the turbocharger 300.

In an embodiment of the present invention, the pressure sensor 710 may be installed adjacent to the back end of the intercooler 280. In other words, the pressure sensor 710 may measure the pressure of air which is compressed in the turbocharger 300 and which is then cooled while passing through the intercooler 280.

The nitrogen oxide (NOx) concentration sensor 720 may be installed on the exhaust passage 610, and may measure the concentration of the nitrogen oxide NOx of the exhaust gas emitted from the engine 200.

The selective catalytic reduction reactor 500 is installed on the exhaust passage 610. The selective catalytic reduction reactor 500 includes a catalyst adapted to reduce nitrogen oxide NOx contained in the exhaust gas emitted from the engine 200. The catalyst nitrogen reduces oxide NOx, contained in the exhaust gas, into nitrogen and water vapor by accelerating a reaction between nitrogen oxide NOx and a reducing agent. In this case, urea may be used as the reducing agent, and urea is decomposed into ammonia $NH_3$ and reacts with nitrogen oxide NOx.

The catalyst may be made of various materials, such as zeolite, vanadium, platinum, etc., which are well known to persons who participate in the corresponding technology field. As an example, the catalyst may have an activation temperature within the range from 250 to 450° C. In this case, the activation temperature refers to a temperature which enables nitrogen oxide to be stably reduced without poisoning the catalyst. When the catalyst reacts outside the activation temperature range, the catalyst is poisoned, and thus efficiency is degraded.

More specifically, a poisoning material which poisons the catalyst may include one or more of ammonium sulfate $(NH_4)_2SO_4$ and ammonium bisulfate $NH_4HSO_4$. Such a catalyst poisoning material is absorbed into the catalyst, and reduces the activity of the catalyst. Such a catalyst poisoning material is decomposed at a high temperature, and thus the poisoned catalyst may be recycled by heating the catalyst.

The temperature sensor 760 measures the internal temperature of the selective catalytic reduction reactor 500. More specifically, the temperature sensor 760 is used to measure the temperature of the catalyst installed inside the selective catalytic reduction reactor 500.

The reducing agent supply unit 400 supplies the reducing agent to the exhaust gas which moves along the exhaust passage 610. Furthermore, the reducing agent supply unit 400 may include a reducing agent storage unit 450 and a reducing agent injection unit 410.

The reducing agent storage unit 450 stores a urea solution in which urea and water are mixed together, and supplies the urea solution into the reducing agent injection unit 410. In other words, the reducing agent injection unit 410 may inject the urea solution in which urea and water are mixed together.

Furthermore, the reducing agent injection unit 410 injects the reducing agent into the exhaust passage 610 between the engine body 200 and the reactor 500. Accordingly, the exhaust gas is mixed with the reducing agent, and the mixture flows into the reactor 500.

When the urea solution is injected from the reducing agent injection unit 410, urea of the urea solution is decomposed due to thermal energy which the exhaust gas has, and thus ammonia $NH_3$ and isocyanic acid HNCO are generated and isocyanic acid HNCO, in turn, is decomposed into ammonia $NH_3$ and carbon dioxide $CO_2$.

In other words, the urea solution is finally decomposed into ammonia, and reacts with nitrogen oxide contained in the exhaust gas.

The control unit 700 determines the amount of reducing agent to be supplied based on info lotion received from the pressure sensor 710 and the nitrogen oxide concentration sensor 720, and performs control so that the reducing agent supply unit 400 supplies the corresponding amount of reducing agent. In this case, the control unit 700 may be the electronic control unit (ECU) of the engine 200, or may be a separate control device.

Figure 2:
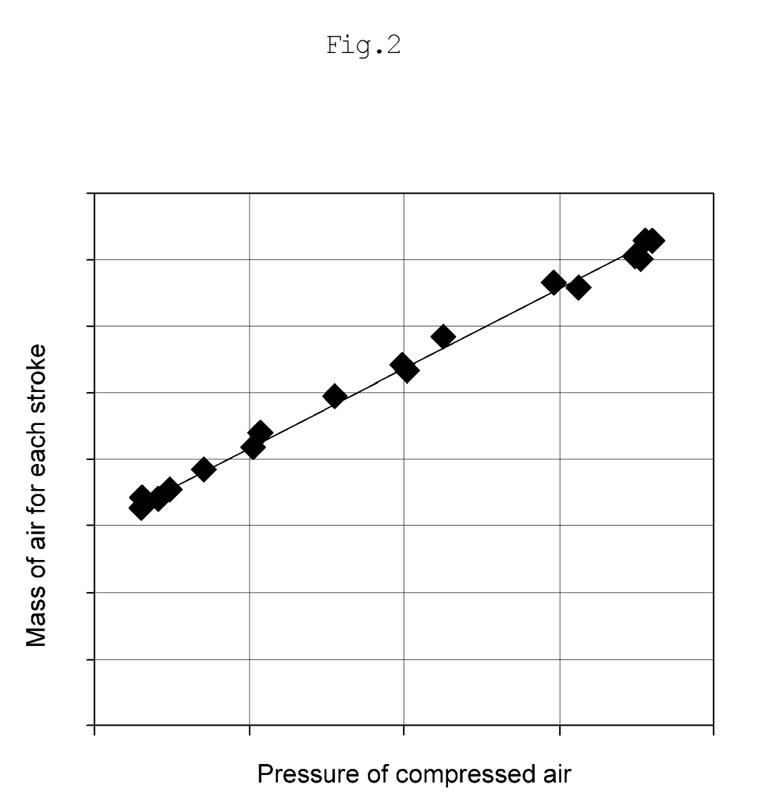
FIG. 2 shows correlation data between the mass of air for each stroke of the cylinders of the engine and the pressure of air to be supplied to an engine by a turbocharger, which is acquired through experiments.

In an embodiment of the present invention, the control unit 700 estimates the mass of air for each stroke by substituting the pressure of the air, actually measured by the pressure sensor 710, into correlation data between the masses and pressures of air which is supplied from the engine 200, as shown in FIG. 2.

In this case, the mass of air may be the mass of air for each stroke of the cylinders of the engine 200, and the pressure of air may be the pressure of air to be supplied to the engine 200. In an engine to which the turbocharger 300 is applied, the pressure of air compressed by the turbocharger 300 may be measured by measuring pressure downstream of the turbocharger 300. The correlations between the masses and pressures of air may be acquired through experiments, and may be stored in the control unit 700. Furthermore, in the present specification, the "downstream" refers to backward based on a direction in which a fluid flows.

As an example, the correlation data between the masses of air for each stroke of the cylinders of the engine 200 and the pressures of air to be supplied to the engine 200 by the turbocharger 300 may be acquired through experiments using a dynamometer.

In this case, in the case of the diesel engine 200 equipped with the turbocharger 300, a result in which the masses of air for each cylinder stroke and boost pressures in back of the stroke compressor 320 of the turbocharger 300 exhibit the linear relationship of a linear expression can be acquired through a great deal of effort and investment.

Furthermore, the control unit 700 calculates the mass of air per hour by using the mass of air for each stroke which is estimated by considering the rotation speed of the engine 200 and the total number of cylinders of the engine 200.

In this case, the control unit 700 may calculate the mass of air per hour by using the following equation:

$$\text{mass of air per hour} \left[\frac{\text{kg}}{\text{hour}}\right] =$$
$$\text{mass of air for each stroke} \left[\frac{\text{mg}}{\text{hour}}\right] * \left(\frac{1 \text{ kg}}{10^6 \text{ mg}}\right) *$$
$$\left(\frac{2 \text{ strokes}}{\text{number of cycles of engine}}\right) * \text{rpm} * \left(\frac{60 \text{ min}}{1 \text{ hour}}\right) * \text{number of cylinders}$$

Thereafter, the control unit 700 calculates the mass of fuel per hour by dividing the mass of air per hour by air-fuel ratio. In this case, the air-fuel ratio is preset by a manufacturer according to the type of engine 200.

The control unit 700 may calculate the total amount of nitrogen oxide, emitted from the engine 200, by using nitrogen oxide (NOx) concentration measured by the nitrogen oxide concentration sensor 720, the mass of air per hour, and the mass of fuel per hour. When the total amount of nitrogen oxide is calculated, the control unit 700 determines the amount of reducing agent to be supplied, which can reduce nitrogen oxide, and controls the reducing agent supply unit 400 so that the corresponding amount of reducing agent is supplied.

Furthermore, in an embodiment of the present invention, the control unit 700 may correct the calculated amount of reducing agent to be injected by considering the rotation speed and load of the engine 200 and the reduction rate of the reducing agent.

The amount of reducing agent to be supplied at the above-described step is a value which is calculated when an ammonia-to-NOx ratio is in a theoretical state (where ANR [Ammonia to NOx Ratio]=1).

However, in the selective catalytic reduction reaction adapted to reduce nitrogen oxide, efficiency may be reduced due to the degree of degradation of the catalyst, the reaction activation temperature of the catalyst, or the like.

Accordingly, it is necessary to supply an amount of reducing agent larger than the above-described theoretically calculated amount of reducing agent to be supplied.

Accordingly, in an embodiment of the present invention, a table may be constructed and used by determining the efficiency of the selective catalytic reduction reaction in the catalyst for each rotation speed and load of the engine 200 through experiments and mapping a reducing agent injection amount correction value for each rotation speed and load of the engine 200 in order to control the actual appropriate amount of reducing agent to be injected for each theoretical value.

By correcting the amount of reducing agent to be supplied by means of the above-described table, the ammonia-to-NOx ratio (ANR) may be set to a higher value in a load interval of the engine 200 in which it is desired to increase selective catalytic reduction reaction efficiency, and then mapping may be performed.

In contrast, in an interval in which a large amount of ammonia slip occurs, the ammonia-to-NOx ratio (ANR) may be set to a lower value, and then mapping may be performed, thereby minimizing the amount of ammonia slip.

Furthermore, in an embodiment of the present invention, the control unit 700 may correct the calculated amount of reducing agent to be supplied according to the temperature of the catalyst.

The catalyst which is used in the selective catalytic reduction reaction has a low-efficiency temperature interval and a high-efficiency temperature interval depending on the type and components thereof.

When the temperature of the catalyst falls within the low-efficiency temperature interval, only urea is consumed without a nitrogen oxide (NOx) reduction effect. Furthermore, a urea crystallization phenomenon may occur when urea is injected.

Accordingly, when the temperature of the catalyst falls within the low-efficiency temperature interval, the amount of reducing agent to be supplied may be corrected such that the amount of reducing agent to be supplied is reduced or restricted.

Furthermore, when the temperature of the catalyst falls within the high-efficiency temperature interval, nitrogen oxide removal efficiency may be maximized by increasing the amount of reducing agent to be supplied.

The activation temperature of the catalyst varies depending on the type and components of the catalyst. As an example, the catalyst may exhibit significantly low efficiency at a temperature below 200° C., and may exhibit significantly high efficiency in the range from 350 to 450° C.

By using the above-described configuration, the power apparatus 101 including a reducing agent supply control system according to the embodiment of the present invention can effectively control the supply of the reducing agent which is used in a reduction reaction of nitrogen oxide.

Figure 3:
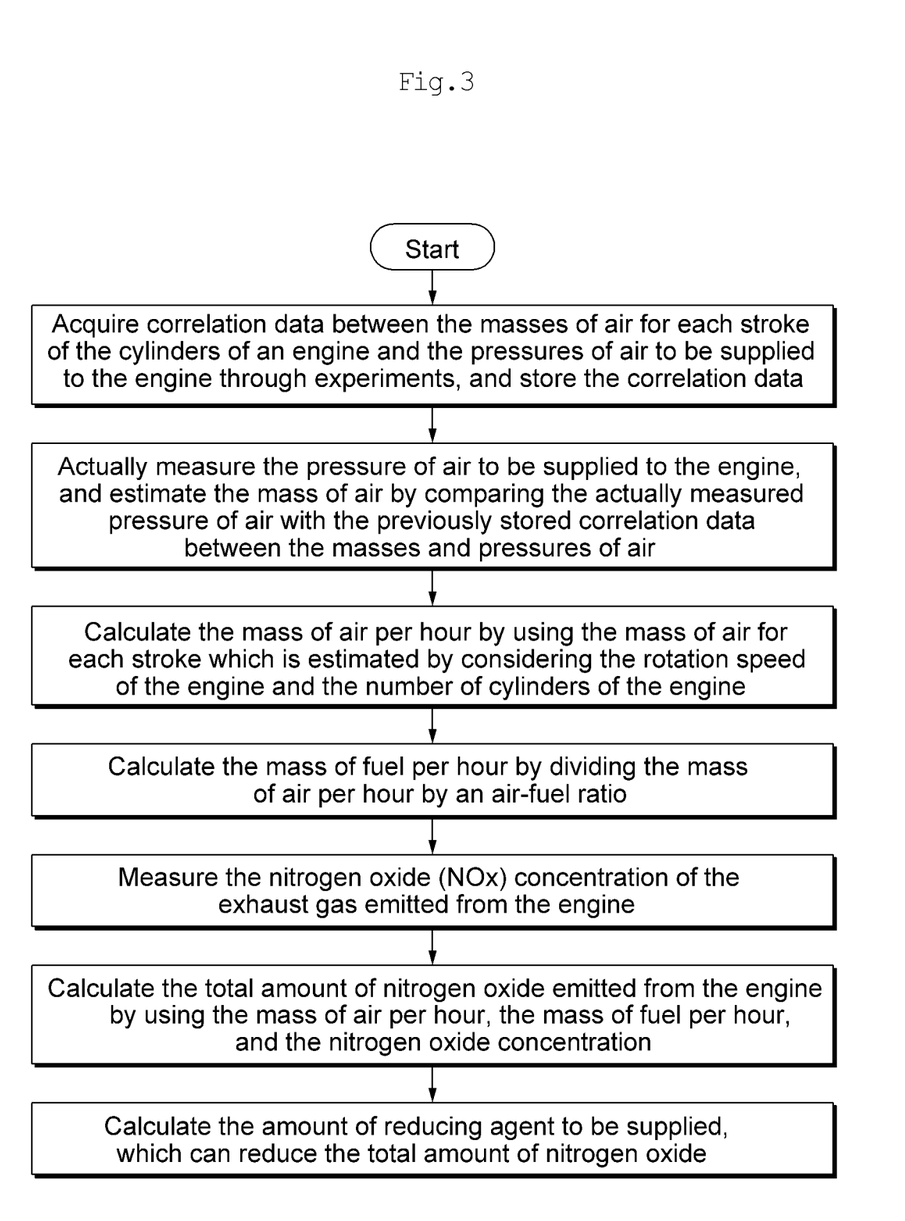
FIG. 3 is a flowchart showing a reducing agent supply control method according to an embodiment of the present invention.

A reducing agent supply control method according to an embodiment of the present invention will be described with reference to FIG. 3.

The reducing agent supply control method according to the embodiment of the present invention is a method for supplying a reducing agent required to reduce nitrogen oxide NOx contained in exhaust gas which is emitted from the engine 200 after the engine 200 has received air compressed by the turbocharger 300 and has burned the air, together with fuel, at the preset air-fuel ratio.

First, the pressure of air to be supplied to the engine 200 is actually measured. When the turbocharger 300 is applied, the actually measured pressure of air may be the pressure of air which is compressed by the turbocharger 300 and then supplied to the engine 200.

The mass of air is estimated by comparing the pressure of air actually measured as described above with previously stored correlation data between the masses and pressures of air. The mass of air may be the mass of air for each stroke of the cylinders of the engine 200. This correlation data may be acquired through previously conducted experiments, and may be stored in the control unit 700.

As an example, the correlation data between the masses of air for each stroke of the cylinders of the engine 200 and the pressures of air to be supplied to the engine 200 by the turbocharger 300 may be acquired through experiments using a dynamometer, and the correlation data may be prepared in the form of a graph.

Thereafter, the mass of air per hour is calculated using the mass of air for each stroke which is estimated by considering the rotation speed of the engine 200 and the total number of cylinders of the engine 200.

In this case, the mass of air per hour may be calculated using the following equation:

$$\text{mass of air per hour} \left[\frac{\text{kg}}{\text{hour}}\right] = \text{mass of air for each stroke} \left[\frac{\text{mg}}{\text{hour}}\right] * \left(\frac{1 \text{ kg}}{10^6 \text{ mg}}\right) * \left(\frac{2 \text{ strokes}}{\text{number of cycles of engine}}\right) * \text{rpm} * \left(\frac{60 \text{ min}}{1 \text{ hour}}\right) * \text{number of cylinders}$$

Thereafter, the mass of fuel per hour is calculated by dividing the mass of air per hour by air-fuel ratio. A value preset by a manufacturer according to the type of engine 200 is provided as the air-fuel ratio.

Thereafter, the nitrogen oxide (NOx) concentration of the exhaust gas emitted from the engine 200 is measured. Furthermore, the total amount of nitrogen oxide emitted from the engine 200 is calculated using the mass of air per hour, the mass of fuel per hour, and the nitrogen oxide concentration.

When the total amount of nitrogen oxide is calculated, the amount of reducing agent to be supplied, which can reduce nitrogen oxide, is calculated.

Thereafter, the reducing agent is supplied according to the calculated value.

Furthermore, in the reducing agent supply control method according to the embodiment of the present invention, the amount of reducing agent to be supplied, which is calculated by considering the rotation speed and load of the engine 200 and the reduction rate of the reducing agent, may be corrected.

In the selective catalytic reduction reaction adapted to reduce nitrogen oxide, efficiency may be reduced due to the degree of degradation of the catalyst, the reaction activation temperature of the catalyst, etc., and thus it is necessary to supply an amount of reducing agent larger than the above-described theoretically calculated amount of reducing agent to be supplied.

Accordingly, in an embodiment of the present invention, a table may be constructed and used by determining the efficiency of the selective catalytic reduction reaction in the catalyst for each rotation speed and load of the engine 200 through experiments and mapping a reducing agent injection amount correction value for each rotation speed and load of the engine 200 in order to control the actual appropriate amount of reducing agent to be injected for each theoretical value.

Furthermore, in the reducing agent supply control method according to the embodiment of the present invention, a reduction reaction adapted to convert nitrogen oxide may be accelerated using a catalyst. Furthermore, the calculated amount of reducing agent to be supplied may be corrected according to the temperature of the catalyst.

The catalyst which is used in the selective catalytic reduction reaction has a low-efficiency temperature interval and a high-temperature interval depending on the type and components thereof.

Accordingly, by correcting the amount of reducing agent to be supplied according to the temperature of the catalyst, the reducing agent may be prevented from being unnecessarily wasted, and also an ammonia slip phenomenon may be prevented from occurring.

As described above, the reducing agent supply control method according to the embodiment of the present invention can effectively control the supply of the reducing agent which is used in a reduction reaction of nitrogen oxide.

Although the embodiments of the present invention have been described with reference to the accompanying drawings, it will be understood by those skilled in the art to which the present invention pertains that the present invention may be practiced in other specific forms without a change to the technical spirit and essential features thereof.

Therefore, it should be understood that the above-described embodiments are illustrative but are not limitative in all aspects, the scope of the present invention is defined by the following claims rather than the detailed description, and all modifications and variations derived from the meanings and ranges of the claims and concepts equivalent to the claims should be construed as falling within the scope of the present invention.

INDUSTRIAL APPLICABILITY

The power apparatus including a reducing agent supply control system and the reducing agent supply method according to the embodiments of the present invention may be used to effectively control the supply of a reducing agent which is used in a reduction reaction of nitrogen oxide.

The invention claimed is:

1. A power apparatus including a reducing agent supply control system, the power apparatus comprising:
   an engine configured to emit exhaust gas containing nitrogen oxide by burning air and fuel at a preset air-fuel ratio;
   an exhaust passage configured such that the exhaust gas emitted by the engine moves therethrough;
   a pressure sensor configured to actually measure a pressure of air which is supplied to the engine;
   a nitrogen oxide concentration sensor installed on the exhaust passage, and configured to measure a nitrogen oxide (NOx) concentration of the exhaust gas;
   a reducing agent supply unit configured to supply a reducing agent to the exhaust gas which moves along the exhaust passage; and
   a control unit configured to determine an amount of reducing agent to be supplied based on information received from the pressure sensor and the nitrogen oxide concentration sensor, and to control the reducing agent supply unit,
   wherein the control unit is further configured to:
   calculate a mass of air for each stroke of one or more cylinders of the engine from the pressure of air, actually measured by the pressure sensor, by using preset correlation data between a pressure and mass of air to be supplied to the engine;
   calculate a mass of air per hour by using a rotation speed of the engine, a total number of cylinders of the engine, and the calculated mass of air for each stroke;
   calculate a mass of fuel per hour by dividing the mass of air per hour by an air-fuel ratio; and
   calculate a total amount of nitrogen oxide emitted from the engine by using the nitrogen oxide (NOx) concentration measured by the nitrogen oxide concentration sensor, the mass of air per hour, and the mass of fuel per hour, and determine an amount of reducing agent to be supplied, which reduces the total amount of nitrogen oxide.

2. The power apparatus of claim 1, wherein the correlation data is set by acquiring correlations between masses of air for each stroke of the cylinders of the engine and pressures of air to be supplied to the engine through experiments.

3. The power apparatus of claim 1, wherein the control unit is further configured to calculate the mass of air per hour by using the following equation:

$$\text{mass of air per hour} \left[\frac{kg}{hour}\right] = \text{mass of air for each stroke} \left[\frac{mg}{hour}\right] * \left(\frac{1 \text{ kg}}{10^6 \text{ mg}}\right) * \left(\frac{2 \text{ strokes}}{\text{number of cycles of engine}}\right) * \text{rpm} * \left(\frac{60 \text{ min}}{1 \text{ hour}}\right) * \text{number of cylinders.}$$

4. The power apparatus of claim 1, further comprising:
   a turbocharger including a turbine configured to be rotated by a pressure which the exhaust gas has and a compressor configured to receive power from the turbine and to compress the air to be supplied to the engine, and installed on the exhaust passage; and
   an intercooler installed on a path between the compressor of the turbocharger and the engine;
   wherein the pressure sensor is installed downstream of the intercooler, and measures the pressure of air which is compressed by the turbocharger and is then supplied to the engine.

5. The power apparatus of claim 1, wherein the control unit is further configured to correct the calculated amount of reducing agent to be injected by considering a rotation speed and load of the engine and a reduction rate of the reducing agent.

6. The power apparatus of claim 1, further comprising:
   a selective catalytic reduction reactor installed on the exhaust passage, and including a catalyst configured to accelerate a reaction between nitrogen oxide contained in the exhaust gas and the reducing agent supplied by the reducing agent supply unit; and
   a temperature sensor configured to measure an internal temperature of the selective catalytic reduction reactor;
   wherein the control unit is further configured to correct the calculated amount of reducing agent to be supplied according to a temperature of the catalyst.

7. A reducing agent supply control method for reducing nitrogen oxide (NOx) contained in exhaust gas emitted by an engine after the engine has received air and has burned the air, together with fuel, at a preset air-fuel ratio, the reducing agent supply control method comprising:
   actually measuring a pressure of air to be supplied to the engine, and calculating a mass of air for each stroke of one or more cylinders of the engine by using preset correlation data;
   calculating a mass of air per hour by using the mass of air for each stroke which is estimated by considering a rotation speed of the engine and a number of cylinders of the engine;
   calculating a mass of fuel per hour by dividing the mass of air per hour by an air-fuel ratio;
   measuring a nitrogen oxide (NOx) concentration of the exhaust gas emitted from the engine;
   calculating a total amount of nitrogen oxide emitted from the engine by using the mass of air per hour, the mass of fuel per hour, and the nitrogen oxide concentration; and
   calculating an amount of reducing agent to be supplied, which reduces the total amount of nitrogen oxide.

8. The reducing agent supply control method of claim 7, wherein the correlation data is related to correlations between masses of air for each stroke of the cylinders of the engine and pressures of air to be supplied to the engine, which are acquired through experiments.

9. The reducing agent supply control method of claim 7, wherein the mass of air per hour is calculated using the following equation:

$$\text{mass of air per hour} \left[\frac{kg}{hour}\right] = \text{mass of air for each stroke} \left[\frac{mg}{hour}\right] * \left(\frac{1 \text{ kg}}{10^6 \text{ mg}}\right) * \left(\frac{2 \text{ strokes}}{\text{number of cycles of engine}}\right) * \text{rpm} * \left(\frac{60 \text{ min}}{1 \text{ hour}}\right) * \text{number of cylinders.}$$

10. The reducing agent supply control method of claim 7, further comprising correcting the calculated amount of reducing agent to be supplied by considering a rotation speed and load of the engine and a reduction rate of the reducing agent.

11. The reducing agent supply control method of claim 7, further comprising:
   accelerating a reduction reaction adapted to convert nitrogen oxide by using a catalyst; and
   correcting the calculated amount of reducing agent to be supplied according to a temperature of the catalyst.

* * * * *